United States Patent [19]
Horimai

[11] Patent Number: 5,323,373
[45] Date of Patent: Jun. 21, 1994

[54] OPTICAL PICKUP DEVICE

[75] Inventor: Hideyoshi Horimai, Kanagawa, Japan

[73] Assignee: Sony Corporation, Tokyo, Japan

[21] Appl. No.: 912,967

[22] Filed: Jul. 10, 1992

[30] Foreign Application Priority Data

Jul. 11, 1991 [JP] Japan ............ 3-196095

[51] Int. Cl.$^5$ ............................................. G11B 7/125
[52] U.S. Cl. ......................................... 369/110; 369/122
[58] Field of Search ............... 369/110, 122, 121, 13; 365/122

[56] References Cited

U.S. PATENT DOCUMENTS

| | | | |
|---|---|---|---|
| 4,449,204 | 6/1984 | Shimada et al. | 360/110 |
| 5,067,122 | 11/1991 | McGee | 369/116 |
| 5,152,597 | 10/1992 | Barnard | 369/110 |
| 5,182,735 | 1/1993 | Kurtz et al. | 369/13 |
| 5,208,799 | 5/1993 | Nakao et al. | 369/110 |

FOREIGN PATENT DOCUMENTS

| | | | |
|---|---|---|---|
| 0107754A1 | 5/1984 | European Pat. Off. | G11B 13/04 |
| 0414440A3 | 3/1991 | European Pat. Off. | G11B 11/10 |

OTHER PUBLICATIONS

Patent Abstracts of Japan, vol. 13, No. 557 (P-974), Dec. 12, 1989 & JP-A-01 232 544 (Sony Corp.), Sep. 18, 1989.
Patent Abstracts of Japan, vol. 5, No. 91 (E-061), Jun. 13, 1981 & JP-A-56 036 185 (Mitsubishi Electric Corp.), Apr. 9, 1981.

Primary Examiner—Paul M. Dzierzynski
Assistant Examiner—James Beyer
Attorney, Agent, or Firm—Philip M. Shaw, Jr.

[57] ABSTRACT

An optical pickup device includes an optical isolator provided in a beam path of an optical system for modulating the laser beam radiated from an end face of a semiconductor laser device and returning it to an end face of the semiconductor laser device, and a detector for detecting changes in an output of the return beam from the other face of the semiconductor laser device. The optical isolator transmits a beam component having the same plane of polarization as that of the laser beam. The magneto-optical recording medium may be reproduced by an optical system without employing a differential optical system.

10 Claims, 5 Drawing Sheets

OPTICAL PICKUP DEVICE

BACKGROUND OF THE INVENTION

1) Field of the Invention

This invention relates to an optical pickup device for reproducing signals recorded on, for example, a magneto-optical recording medium.

2) Prior Art

The method for detecting signals of a magneto-optical recording medium, such as a magneto-optical disc, consists in detecting the information recorded as the direction of magnetization on a signal recording surface of the magneto-optical disc after converting it into minute rotation of a polarization plane by the Faraday effect or the Kerr effect which is the interaction between the light and magnetization. However, since the pin photo diode etc. taking charge of photoelectric conversion lacks in selectivity with respect to polarized beam, there is employed a method of detecting the rotation of the polarization plane after converting it into changes in beam intensity using a polarized beam splitter or a polarizer.

3) Description of the Prior Art

Referring to FIG. 1, a conventional signal detecting device for a magneto-optical disc is explained. In this figure, the laser beam from a laser beam source 21, such as a semiconductor laser device, is a laser beam of a P polarization component (P wave). This laser beam is irradiated on the signal recording surface of the magneto-optical disc 9 by an objective lens 20 via a beam splitter 22 so as to be converged on the signal recording surface. The light reflected from the magneto-optical disc 9 is again incident on the beam splitter 22 and again reflected by the beam splitter 22. The reflected beam from the beam splitter 22 has its polarization plane rotated by 45° by a ¼ wavelength plate 23 and is separated by a polarized beam splitter (PBS) 24 into polarized beam components having planes of polarization which are at right angles relative to each other. The first polarized light component reflected by the polarized beam splitter 24 is incident on a photodetector 25 constituted by a pin diode. The second polarized beam component transmitted through the polarized beam splitter 24 is incident on a photodetector 26 similarly constituted by a pin photo diode. Output signals of the photodetectors 25, 26 are inputted to a differential amplifier 27 by which in-phase components are removed. That is, the in-phase components are removed by an optical differential method, so that only signals of the magneto-optical disc, that is optical magnetic signals, are detected.

Signals recorded on a magneto-optical disc are usually detected by taking advantage of changes in intensities of the beam reflected from the optical disc. In such case, a servo control system, such as focusing and tracking control units, need to be provided in the optical pickup device, in addition to optical components for reading information signals from the optical disc, so that the laser beam from the laser beam source is focused on a signal recording surface of the disc while the laser beam correctly follows the recording track(s) of the disc. Random accessing may be achieved by feeding the optical pickup device radially of the disc. Above all, if faster random accessing is demanded of an optical disc recording and/or reproducing apparatus, the feed velocity of the optical pickup device becomes crucial. For achieving a fast feed of the optical pickup device, it is required of the optical pickup device to be of a small size and a small weight.

In order to meet this demand, a self-coupled optical pickup (SCOOP) making use of a self-coupling effect of a laser diode, is under investigation. FIG. 2 shows an arrangement of the self-coupled optical pickup which is required for signal detection of the optical recording medium, as taught by, for example, the Japanese Patent Publication No. 57-58735 (1982).

In FIG. 2, a laser diode 41 has two parallel cleavage end faces 41a, 41b, running at right angles to a pn junction surface 41j, which cleavage end faces constitute reflecting mirror surfaces to provide light resonation.

When a driving current I is injected from, for example, a driving circuit, laser oscillation is produced at higher than a threshold value of the injection current, so that a laser beam is radiated from the end face 41a. The laser beam is passed through a collimator lens 43 and an objective lens 44 and converged on a reflecting mirror M which may, for example, be a reflecting surface of an optical disc, such as its signal recording surface. The laser beam is then reflected by this reflecting mirror M and returned to the end face 41a of the laser diode 41 to constitute an external resonator.

If there is any return beam, the threshold value of the injected current is decreased substantially in proportion to the intensity of the return beam. If the value of the injected current is set at an intermediate value Im between the threshold value when there is the return beam and that when there is no return beam, a beam emitted from the laser diode 41 is significantly changed in conformity to changes in reflectance of the reflective mirror M. A rear beam emitted from another end face 41b of the laser diode 41 is also significantly changed in proportion to a light output from the end face 41a, so that, by providing a photodetector 42, such as a photodiode, facing the end face or terminal 41b, for detecting the rear beam emitted of the laser diode 41, an optical pickup which is small-sized and lightweight may be produced.

Meanwhile, the laser diode 41 and the photodetector 42 may be accommodated in one and the same package. The collimator lens 44 may also be omitted to provide a unitary lens system.

Although it is possible with the above-mentioned SCOOP to reduce the size and the weight and to lower the costs of the optical pickup device, there is raised a problem of a high signal noise level, above all, a problem of a noise caused by stimulated vibrations produced as a result of the distance between the beam source and the reflecting surface of the return beam and the beam velocity. The present Assignee has already proposed in JP-A-01 232544 a pulse read system in which, by setting the irradiation time duration of a laser beam intermitted at a predetermined period so as to be shorter than the basic period of the vibrations produced by the return beam, any noise produced by the stimulated vibrations may be inhibited to provide a SCOOP type optical pickup device of a practically useful level.

However, a differential optical system is still needed, as in the case of FIG. 1, if the SCOOP is to be used for reproducing the magneto-optical disc. Thus the above proposal has not been fully satisfactory in mitigating the complexity of the optical pickup device.

Furthermore, signals $+\theta_k$ and $-\theta_k$ are reproduced as magneto-optical (MO) signals of the magneto-optical recording medium. After reproduction, these signals are frequently detected by differentiation by an electric circuit for decoding as data. Since the differential detection is carried out on a time frequency scale, it becomes necessary to change the equalizer setting by the difference in MTF. For example, it is necessary to change the time constant depending on, for example, the linear velocity of the disc during reproduction or on the difference between the velocities on the inner and the outer peripheries.

OBJECT AND SUMMARY OF THE INVENTION

In view of the above depicted status of the art, it is an object of the present invention to provide a small-sized inexpensive optical pickup device for reproducing the MO signals of the magneto-optical recording medium.

The present invention provides an optical pickup device comprising, a semiconductor laser device, an optical system for directing a laser beam radiated from a first face of the semiconductor laser device to a recording surface of an optical disc, a optical isolator arranged in a beam path of the optical system for transmitting to the first face of the semiconductor laser device a component of a return beam reflected from the recording surface and having a same plane of polarization as that of the laser beam radiated from the semiconductor laser device and diverting the return beam, minus the component, out of the beam path of the optical system, and a photo detecting means for detecting changes in an output of the return beam exiting from a second face of the semiconductor laser device.

The laser beam is modulated by rotation of the plane of polarization of a laser beam when the laser beam is reflected by a recording surface of the magneto-optical recording medium, such as a magneto-optical (MO) disc. A polarized beam splitter (PBS), for example, may be used as the optical isolator. The laser beam returned to the laser device has its beam intensity changed in accordance with the recording information. Specifically, the arrangement may be so made that the P-wave from the PBS is converted into a circularly polarized beam by a ¼ wavelength plate arranged between the PBS and MO disc and irradiated on the MO disc while the reflected light is converted by a ¼ wavelength plate into a linearly polarized beam, with the S-wave component, a main component of the linearly polarized beam, being reflected by the PBS and the P-wave component, a MO signal component, being transmitted through the PBS so as to be returned to the semiconductor laser device.

With the present optical pickup device, the laser beam radiated from the semiconductor laser device is radiated on the magneto-optical recording medium, such as a MO disc, and changes in the beam intensity consistent with the recording information are produced by the rotation of the plane of polarization of the laser beam reflected by the magneto-optical recording medium in accordance with the recording information for detecting the MO signal component by taking advantage of the SCOOP phenomenon by the semiconductor laser device. Besides, the reproduced MO signals are already spatially differentiated. Since the detection by differentiation is not made with respect to time, there is no necessity of changing the time constant depending on the linear velocity of the disc during reproduction or the difference in the disc velocity at the inner and the outer disc peripheries.

Other objects and advantages of the present invention will become apparent from the following description.

DETAILED DESCRIPTION OF THE PREFERRED EMBODIMENT

Figure 1:
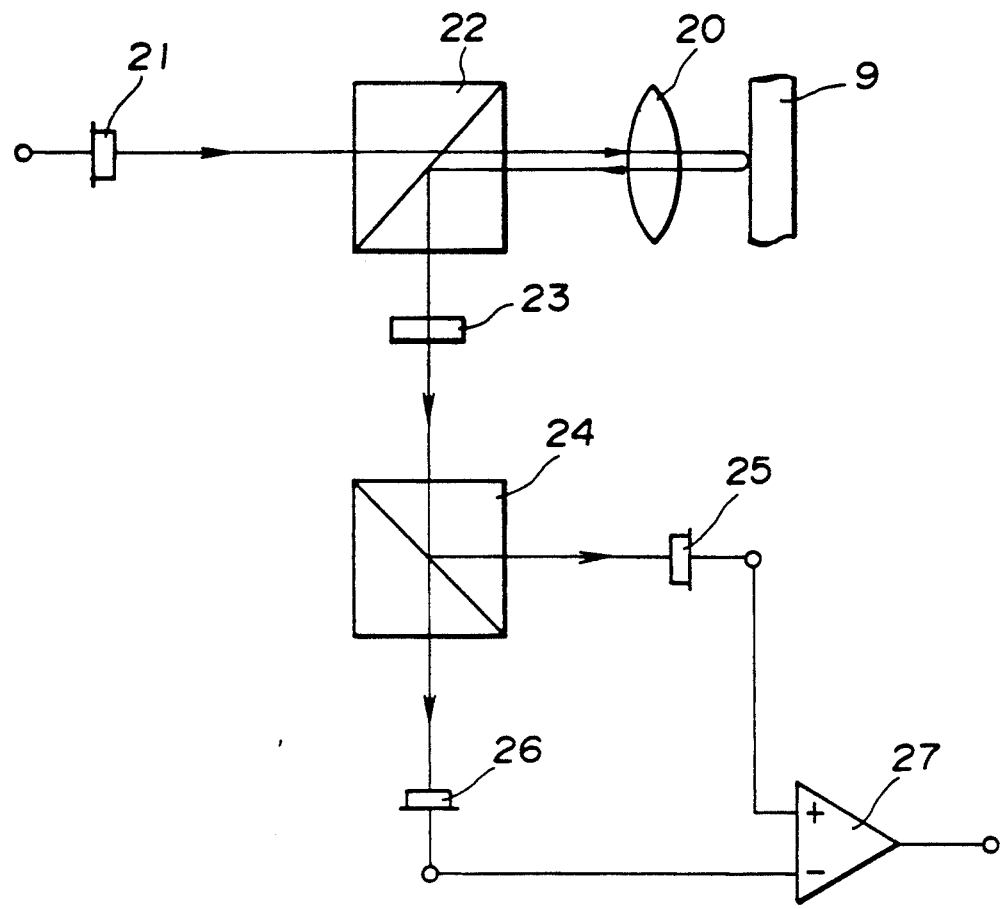
FIG. 1 shows an arrangement of a conventional optical pickup device for detecting MO signals.
Figure 2:
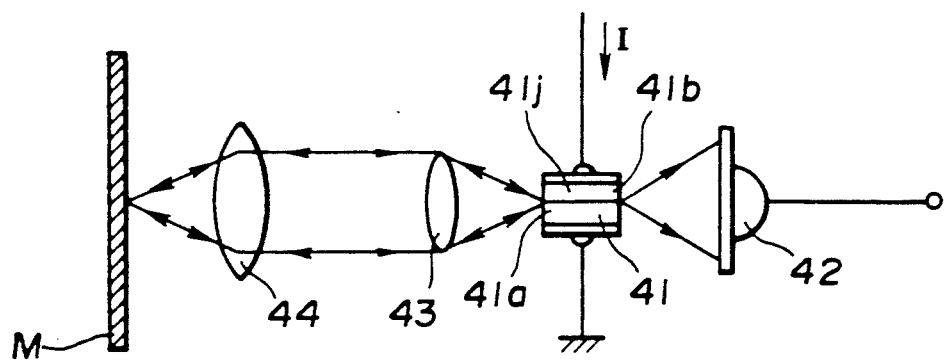
FIG. 2 shows an arrangement of an optical pickup device employing the SCOOP phenomenon of an optical recording medium reproducing apparatus.

Referring to the drawings, an embodiment of a signal detection device of a magneto-optical recording medium according to the present invention is explained.

Figure 3:
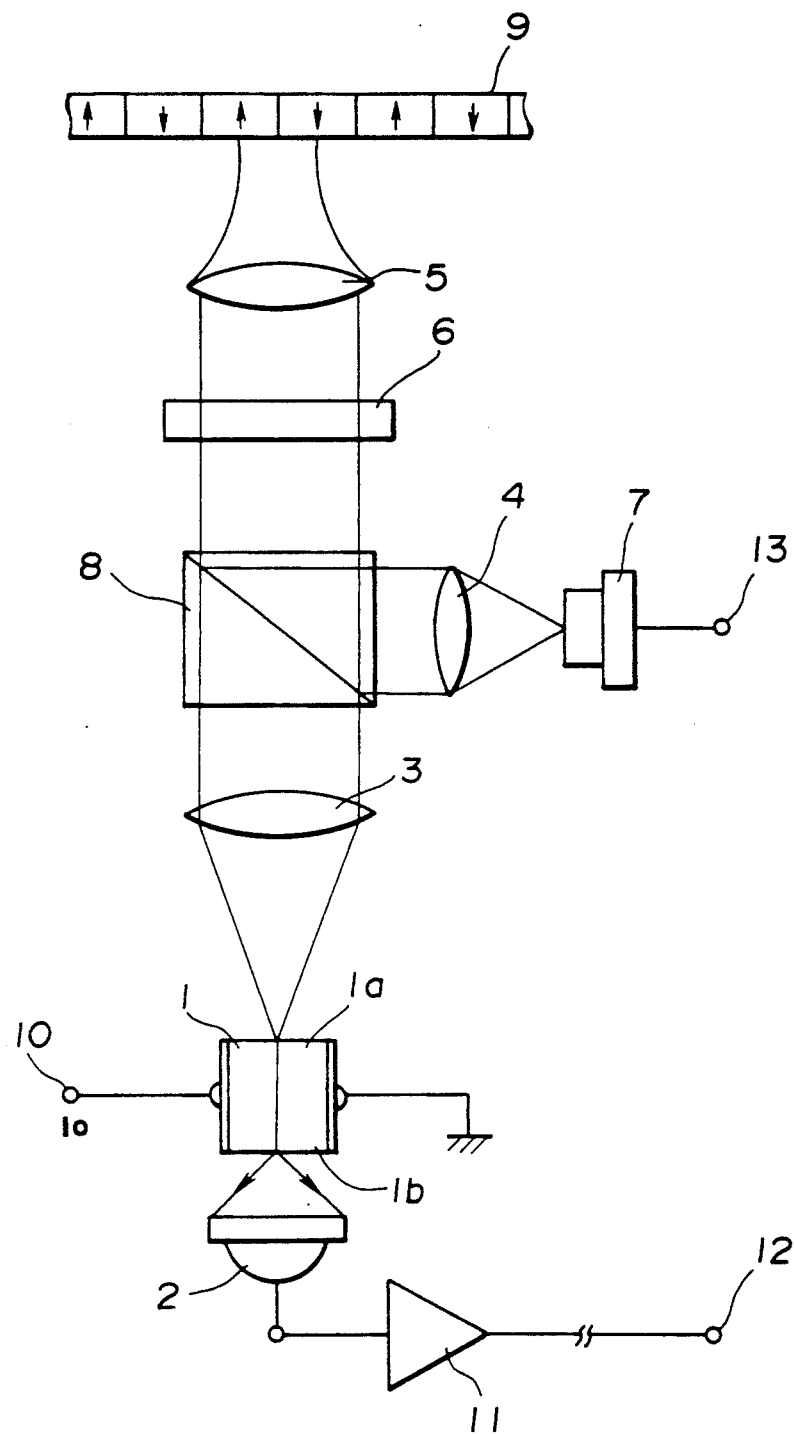
FIG. 3 shows an arrangement of an optical pickup device embodying the present invention.

FIG. 3 is a schematic view showing an optical pickup device for a magneto-optical recording medium, such as a magneto-optical disc.

Referring to FIG. 3, a laser diode 1 having a pn junction has two parallel cleavage end faces 1a, 1b extending at right angles to the pn junction, each of these end faces functioning as reflective mirror surfaces to constitute an optical resonator. The laser beam radiated from a terminal 1a of the laser diode 1 is irradiated on the magneto-optical recording medium 9 by way of a collimator lens 3, a polarized beam splitter 8, a ¼ wavelength plate 6 and an objective lens 5. The polarized beam splitter 8 and the ¼ wavelength plate 6 constitute an optical isolator frequently employed with an optical disc.

The polarized beam splitter 8 separates the incident laser beam reflected from the magneto-optical recording medium 9 through the ¼ wavelength plate 6, depending on the direction of rotation of the polarization plane of the laser beam. That is, the polarized beam splitter 8 transmits the P-wave, as an electrical field component of the beam wave parallel to the plane of incidence of the beam splitter 8, while reflecting the S-wave, as an electrical field component of the light wave which is normal to the plane of incidence of the beam splitter.

Since the beam output (outgoing light volume) of the laser diode 1 is changed by the SCOOP phenomenon in conformity to the P-wave incident on the laser diode 1 as a return beam, and the rear beam output from the rear end face 1b is changed in proportion to changes in the outgoing light volume, the rear beam output is detected by a photodetector 2, such as a pin photo diode 2, so as to be outputted at a terminal 12 by means of an amplifier 11.

Figure 4:
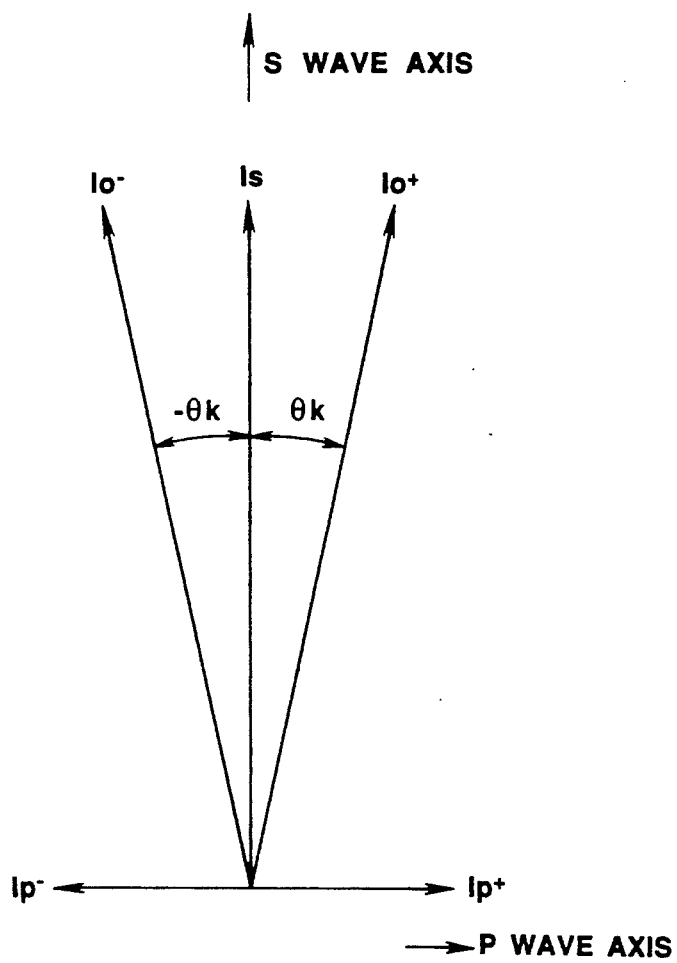
FIG. 4 shows polarized beam components of a reflected beam from the magneto-optical disc.

The operation of the optical pickup device, arranged as shown in FIG. 3, is explained by referring to FIG. 4.

In FIG. 3, the laser diode 1, which is a light source, is a single-mode laser diode radiating a P-wave laser beam having a wavelength of 830 nm. The laser beam from terminal 1a of the laser diode 1 is incident on the polarized beam splitter 8 by means of a lens 3. The polarized beam splitter 8 has the properties of directly transmitting the component parallel to the plane of incidence (P-wave) while reflecting the component normal to the plane of incidence (S-wave) at an inclined prism surface. Therefore, if the direction of the linearly polarized beam of the laser diode 1 is coincident with the direction parallel to the plane of incidence of the polarized beam splitter 8, the beam is transmitted through the beam splitter 8.

The P-wave transmitted through the polarized beam splitter 8 is incident on the ¼ wavelength plate 6 which is adapted for converting the linearly polarized beam into a circularly polarized beam. This circularly polarized beam is converged by the lens 5 so as to be irradiated on the magneto-optical recording medium 9. The Kerr effect is utilized to read the information recorded as the direction of magnetization. The Kerr effect means a phenomenon in which the laser beam, which is a kind of the electromagnetic wave, has its plane of polarization rotated when the laser beam is reflected on the surface of the magneto-optical recording medium 9. The plane of polarization is rotated in an opposite direction when the direction of magnetization of the magneto-optical recording medium is reversed.

FIG. 4 shows polarized light components of the reflected light from the magneto-optical recording medium 9. In this figure, the direction of S-polarization of the laser beam incident on the magneto-optical recording medium 9 is the longitudinal axis (S-wave axis). In this case, the reflected beam reflected by the magneto-optical recording medium 9 is indicated $I_0^-$ and $I_0^+$, depending on the direction of magnetization of the magneto-optical recording medium 9. $\theta_k$, $-\theta_k$, $I_s$ and $I_p$ indicate an angle between the S-wave axis and the reflected beam $I_0$, an angle between the S-wave axis and the reflected beam $I_0-$, an S-polarization component (S-wave) and a P-polarization component (P-wave), respectively. That is, if the magnetization is directed vertically upwardly with respect to the magneto-optical recording medium 9, and the plane of polarization is rotated by $+\theta_k$ towards right, the reflected beam is inversely rotated by $-\theta_k$ towards left if the magnetization is directed downwards. Therefore, the laser beam impinged on an area of upward magnetization has its plane of polarization inclined by $2\theta_k$ with respect to that impinged on an area of downward magnetization.

The reflected beam is again incident on the ¼ wavelength plate 6 operating for converting the circularly polarized beam into a linearly polarized beam. It is noted that the output from the ¼ wavelength plate 6 is a linearly polarized beam having a direction of polarization at right angles to the direction of polarization with which the beam first passed through the ¼ wavelength plate 6. The laser beam incident on the polarized beam splitter 8 has a component normal to the plane of incidence. That is, the S-wave is reflected by the polarized beam splitter 8 in the direction of the photodetector 7. The reflected S-wave is converged by means of the lens 4 on the photodetector 7, such as a pin photo diode. The S-wave is converted by the photodetector 7 into the electric current which is supplied via an output terminal 13 to a detecting functional unit (not shown) for detecting focusing, tracking and address signals for controlling the laser spot to be directed on the track(s) of the magneto-optical recording medium 9.

On the other hand, since only the P-wave is left in the MO signal component which has read the magneto-optical disc 9, by the operation of the polarized beam splitter 8, it is transmitted through the polarized beam splitter 8 so as to be incident on the end face 1a of the laser diode 1 by way of he collimator lens 3. This produces the SCOOP effect to increase the laser power to increase the output of the photodetector 2, such as a pin photo diode.

Figure 5:
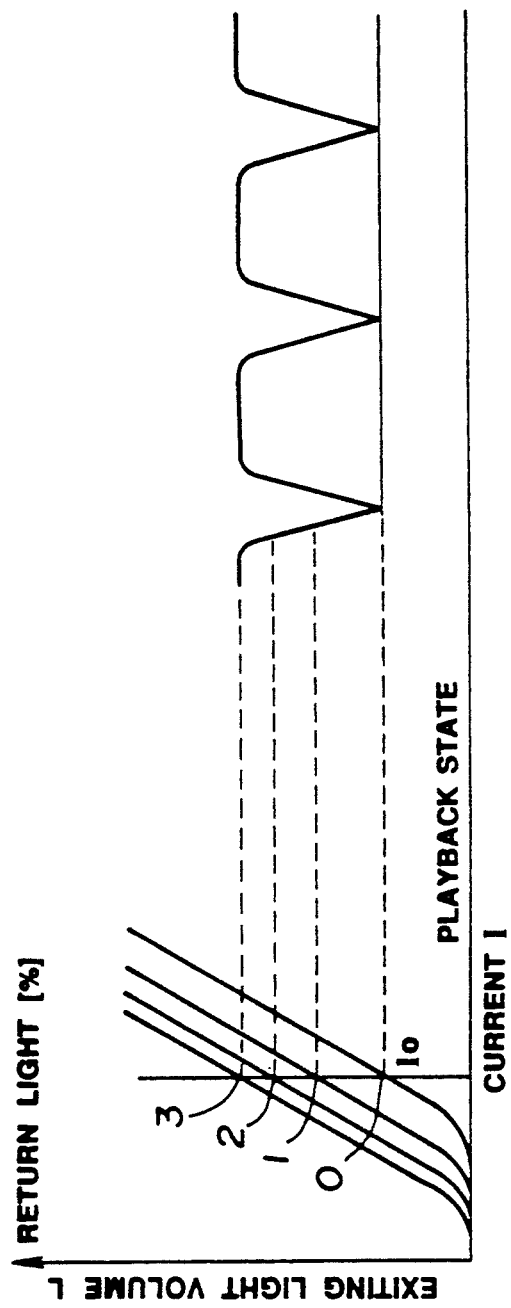
FIG. 5 is a graph showing the injection current versus the outgoing beam intensity in a laser diode employed in the embodiment of the present invention.

In FIG. 5 is shown, the relationship between the current supplied to the laser diode 1 and the outgoing light volume from the end face 1a of the laser diode 1, with different amounts in percentages of the return beam from the magneto-optical recording medium 9 as a parameter.

In FIG. 5, left hand side, the current supplied I is plotted on the abscissa and the outgoing light volume L is plotted on the ordinate. If the volume of the return beam is increased from 0% through 1% and 2% to 3%, that is if the return beam intensity is increased, for the constant supply current I, the outgoing light volume L in the reproducing state is increased.

Meanwhile, the angle $\theta_k$ in FIG. 4 is the above-mentioned rotation angle of the polarization plane (Kerr rotation angle). If the MO signal during reproduction is such that $\theta=0$ which is intermediate between $+\theta_k$ and $-\theta_k$, beam isolation is achieved, so that the laser power is restored to its original value.

Figure 6:
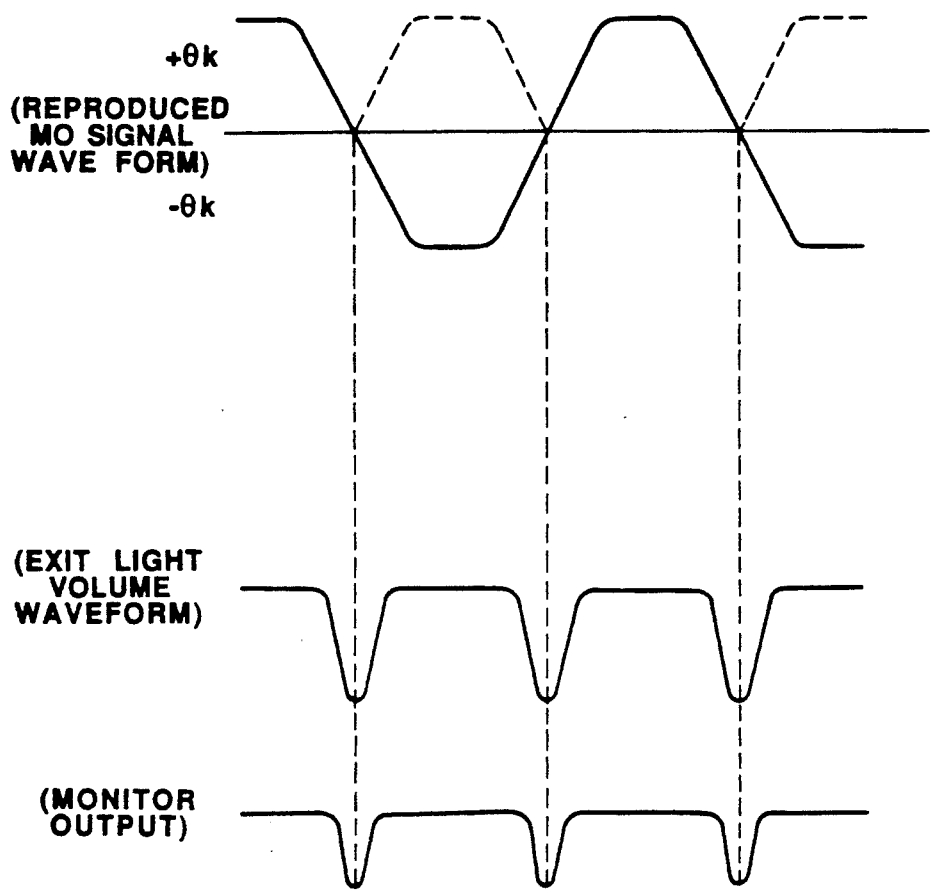
FIG. 6 is a waveform diagram showing the waveform of original reproduced MO signals and the waveform of the MO signals obtained by direct differential detection.

It is noted that, if the inherent reproduced MO signal waveform is as indicated by a solid line shown in FIG. 6, since the return beam intensity to the laser diode 1 is irrelevant to the polarity of the reproduced MO signal waveform, the negative component $-\theta_k$ is also presented in the positive side, as shown by broken line in FIG. 6, so that an absolute value is taken. That is, the return beam intensity becomes the minimum value of zero for $\theta=0$, with the return beam intensity being increased when the value of $\theta$ is changed from $\theta=0$ in the positive direction or in the negative direction.

If the return beam intensity is changed in this manner in a range of from 0% to 3%, the outgoing light volume L is changed in the manner as shown in the right hand portion of FIG. 5, because of characteristics shown in the left side of FIG. 5. Thus, with the reproduced MO signal waveform, shown in FIG. 6, and the above-mentioned return beam intensity, the exit light volume shown in FIG. 6 is produced. At this time, the rear light output proportionate to changes in the output light volume shown in FIG. 6 is detected at the rear end 1b of the laser diode 1 of FIG. 3, by the photodetector 2, as represented as a monitoring output as shown in FIG. 6.

In this manner, the magneto-optical recording medium may be reproduced by an optical system as simple as that used with an optical disc, such as a compact disc, so that the optical pickup device may be mass-produced at reduced costs without the necessity of providing a differential optical system as required in conventional systems.

The reproducing signals obtained with the optical pickup device of the present invention are already differentiated, as shown at the bottom of FIG. 6. This means that detection by differentiation by an electrical circuit, hitherto necessary for decoding data after signal reproduction, is no longer necessary, thus enabling reduction of circuit components.

The detection by differentiation has been obtained spatially by an optical system without necessitating differentiating electrical circuits hitherto required for differentiation with respect to time. In this manner, detection by differentiation may be achieved in a manner irrelevant to linear velocity during disc reproduction or time constant switching responsive to difference between the disc velocities at the inner and outer disc peripheries. Besides, since the detection by differentiation is achieved at the response level of the laser diode, high operation speeds may be achieved. By development of the SCOOP employed in an optical pickup device of the embodiment of the present invention, a small sized optical device may be achieved.

The optical pickup device according to the present invention is composed mainly of an optical isolator for transmitting the component having the same plane of polarization as that of the laser beam in an optical path of an optical system which is adapted for modulating a laser beam radiated from an end face of a semiconductor laser device and returning the modulated laser beam to the end face of the laser device, and a photo detector for detecting changes in a beam output of the return beam from a second end face of the laser device, so that it becomes possible to use a SCOOP, employed for reproducing the optical recording medium, such as an optical disc, in a magneto-optical recording medium, such as a magneto-optical disc. That is, the magneto-optical disc may be reproduced without employing a differential optical system. That is, the differential optical system, which has hitherto been necessary for signal detection after reading the signals recorded on the magneto-optical recording medium, and which has complicated the construction of the optical pickup device, may be dispensed with to permit of cost reduction and facilitated mass production.

Besides, with the optical pickup device of the present invention, since the reproduced signals are already detected by differentiation, circuit construction may be simplified. Also it is unnecessary to switch the time constants depending on the linear velocity at the time of disc reproduction or the difference between the inner and outer disc peripheries. In addition, since the detection by differentiation is achieved by the response rate of the laser diode, a higher operating speed may be achieved easily.

What is claimed is:

1. An optical pickup device comprising:
   a semiconductor laser device,
   an optical system for directing a laser beam radiated from a first face of said semiconductor laser device to a recording surface of an optical disc;
   an optical isolator means arranged in a beam path of said optical system for transmitting to the first face of the semiconductor laser device a component of a return beam reflected from the recording surface and having a same plane of polarization as that of the laser beam radiated from said semiconductor laser device and diverting the return beam, minus the component, out of the beam path of the optical system; and
   a photo detecting means for detecting changes in an output of the return beam exiting from a second face of said semiconductor laser device.

2. An optical pickup device as claimed in claim 1 wherein said optical isolator means has an optical element for converting the laser beam supplied from said semiconductor laser device into a circularly polarized beam.

3. An optical pickup device as claimed in claim 1 wherein said optical system also has an objective lens for converging the laser beam radiated from said semiconductor laser device at a point on the recording surface.

4. An optical pickup device as claimed in claim 2 wherein said optical element is a ¼ wavelength plate.

5. A magneto-optical pickup device in which a linearly polarized laser beam from a laser is converged by an optical system on a signal recording surface of a magneto-optical recording medium, and in which a return laser beam reflected from the magneto-optical recording medium is detected by photodetector means for reading information signals recorded on the magneto-optical recording medium, wherein the improvement comprises:
   a semiconductor laser device as the laser for generating the linearly polarized laser beam to exit from a first face of the semiconductor laser device;
   the optical system includes an objective lens and an optical isolator means arranged in a beam path of the return laser beam for transmitting a beam component of the return laser beam to the first face of the semiconductor laser device so that the beam component exits from a second face of the semiconductor laser device, the beam component having the same polarization plane as that of the laser beam radiated from said semiconductor laser device, said optical system irradiating the laser beam from said semiconductor laser device on the magneto-optical recording medium and diverting the return beam, minus the beam component, away from said semiconductor laser device; and
   said photodetector means detects changes in the beam component which exits from said second face of said semiconductor laser device.

6. A magneto-optical pickup device as claimed in claim 5 wherein said optical system has an optical device for converting the laser beam into a circularly polarized beam.

7. A magneto-optical pickup device as claimed in claim 6 wherein the optical device of said optical system is arranged between said light isolator means and said objective lens.

8. A magneto-optical pickup device as claimed in claim 6 wherein said optical device is a ¼ wavelength plate.

9. A method of reproducing information signals recorded on a recording surface of a magneto-optical recording medium comprising the steps of:
   generating a linearly polarized laser beam in a semiconductor laser and outputting the laser beam from a first face of the semiconductor laser onto the recording surface to produce a reflected beam;
   transmitting to the first face of the semiconductor laser a component of the reflected beam which has a same polarization as the linearly polarized laser beam and diverting a remaining portion of the reflected beam away from the semiconductor laser, whereby the beam component passes through the semiconductor laser and exits from a second face of the semiconductor laser; and
   detecting the intensity of the beam component exiting from the second face of the semiconductor laser.

10. The method according to claim 9, wherein the transmitting step comprises the steps of:
    passing the linearly polarized laser beam successively through a beam splitter and a ¼ wavelength plate to the recording surface and passing the reflected beam successively through the ¼ wavelength plate and the beam splitter.

* * * * *